United States Patent [19]
Gros

[11] 4,044,869
[45] Aug. 30, 1977

[54] RELEASE STOP FOR DISC CLUTCH
[75] Inventor: Hermann Gros, Friedrichshafen, Germany
[73] Assignee: Motoren- und Turbinen-Union Friedrichshafen GmbH, Germany
[21] Appl. No.: 582,687
[22] Filed: June 2, 1975
[30] Foreign Application Priority Data
  June 28, 1974 Germany .............................. 2431104
[51] Int. Cl.² ............................................. F16D 25/10
[52] U.S. Cl. .............................. 192/48.91; 192/87.17; 192/109 R
[58] Field of Search ............ 192/111 A, 87.17, 70.25, 192/48.91, 109 R

[56] References Cited
U.S. PATENT DOCUMENTS

| | | | |
|---|---|---|---|
| 2,919,778 | 1/1960 | Aschauer | 192/87.17 |
| 3,007,561 | 11/1961 | Hartig | 192/111 A |
| 3,032,157 | 5/1962 | Richards | 192/87.17 |
| 3,064,781 | 11/1962 | Schwartz et al. | 192/87.17 |
| 3,086,634 | 4/1963 | Reed | 192/111 A |
| 3,099,166 | 7/1963 | Schou | 192/87.17 |
| 3,297,122 | 1/1967 | Simonson | 192/111 A |
| 3,369,639 | 2/1968 | Steinhagen | 192/87.17 |
| 3,410,375 | 11/1968 | Schmidt | 192/111 A |
| 3,747,729 | 7/1973 | Storer | 192/70.25 |

Primary Examiner—Benjamin W. Wyche
Attorney, Agent, or Firm—Craig & Antonelli

[57] ABSTRACT

A lamellae clutch with a large number of lamellae and with a pressure disk adapted to compress the lamellae during engagement of the clutch; the play between the individual lamellae is thereby determined by the length of slide bolts arranged in bores of the pressure disk whereby the slide bolts exceed by a predetermined amount the thickness of the pressure disk.

5 Claims, 1 Drawing Figure

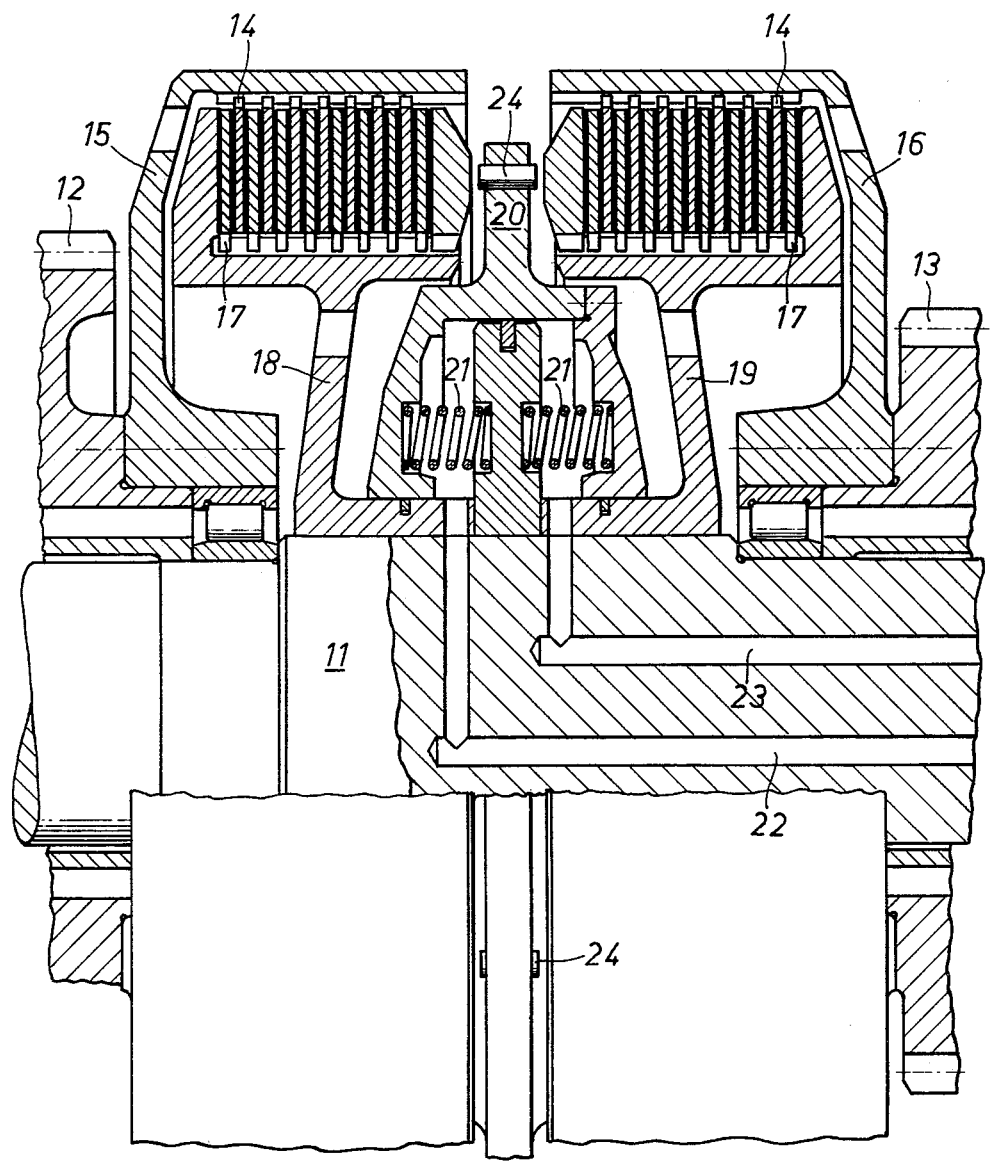

RELEASE STOP FOR DISC CLUTCH

The present invention relates to a disk clutch with a large number of lamellae and with a pressure disk compressing the lamellae during the engagement of the clutch.

The aim of the present invention is the attainment of as small as possible a friction work when the clutch is disengaged or opened and when the lamellae friction surfaces rotate at different rotational speeds or even rotate past one another in opposite directions. This friction work is, as has also been confirmed by tests, dependent on the venting path or the distance of the non-compressed lamellae with respect to one another, i.e. the clearance between the non-compressed lamellae. If this distance or spacing is too small, then the lamellae frictionally engage at one another excessively strongly and a work loss results together with the harmful friction heat connected therewith. With an increasing enlargement of the spacing, the work loss decreases, however, after achieving a minimum value, it increases again. This renewed increase of the work loss is caused by the contact of the friction surfaces by reason of the wobbling lamellae which tumble or wobble with a large spacing.

Thus, an optimum venting path is coordinated to each disk clutch, which is dependent on the number and dimension of the lamellae, on the type of construction of the clutch and on the operating conditions and which can be determined relatively simply in practical tests.

However, the maintenance of the determined optimum venting path during the assembly of the clutch involves difficulties because the thickness of the lamellae is beset by a tolerance. This will become noticeable in an undesirable manner especially when a large number of lamellae are installed into the clutch or a double clutch is used with a pressure disk in the center between two lamellae sets or packets. For that reason, the lamellae were heretofore individually measured prior to the assembly and were assembled into lamellae sets or packets with identical dimensions in order to then achieve the required optimum venting path during the installation into the clutch by reason of the housing-- and pressure disk dimensions.

However, this prior art method is complicated and costly. The use of pressure disks with different thicknesses which are determined during the assembly and eventually are manufactured specially forms another possibility. However, also this method is applicable only poorly in a series assembly for rationalization reasons and because of the problems as regards spare part stocking.

It is therefore the aim of the present invention to enable the non-selective assembly of the clutch lamellae into lamellae sets or packets without having to accept the expenditures of the subsequent machining of the pressure disks.

The underlying problems are solved according to the present invention in that slide bolts are arranged in the pressure disk within bores extending parallel to the clutch axis, whose length, determined as a function of the thickness of the lamellae package, exceeds the thickness of the pressure disk and which determine the play or clearance between the individual lamellae with a vented or disengaged clutch.

In contrast to the measuring of the individual lamellae disks and the assembly of lamellae packets or sets with identical dimensions or to changes of the thickness of the pressure disk to the necessary dimension, the readying of slide bolts with differing length can be readily realized. Pre-manufactured lengths of standardized fitting pins may thereby be used or the fitting pins can be ground to the required length dimension during the assembly. The correctly fitting bolts can be supplied along in case of an exchange of the lamellae packet or set.

These and other objects, features and advantages of the present invention will become more apparent from the following description when taken in connection with the accompanying drawing which shows, for purposes of illustration only, one embodiment in accordance with the present invention, and wherein:

The single FIGURE is a partial axial cross-sectional view through one embodiment of a double clutch with a pressure disk between the lamellae packages in accordance with the present invention.

Referring now to the single FIGURE of the drawing, two gears 12 and 13 are rotatably supported on a driven shaft 11 of a transmission and are connected with the output of the transmission by way of further gear wheels and intermediate wheels (not shown). An opposite direction of rotation thereby results for the two gears 12 and 13, as known in the art.

Outer lamellae or friction disks 14 are non-rotatably connected with the gears 12 and 13 respectively by way of two splined hollow shafts 15 and 16 and the internal lamellae or friction disks 17 are non-rotatably connected with the shaft 11 by way of two entrainment members 18 and 19, respectively, provided with a splined profile.

A pressure disk 20 is retained in the illustrated center position by springs 21. Upon supply of pressure oil by way of lines 22 or 23, the pressure disk 20 is axially displaced in the one or the other direction and thereby compresses the corresponding lamellae for the one or the other direction of rotation of the transmission.

According to the present invention, slide bolts 24 are arranged in the pressure disk 20 within bores extending parallel to the clutch axis. When the pressure disk 20 presses against the one or the other lamellae package, the slide bolts 24 are axially displaced in their bore and limit by their length the play between the lamellae of the vented clutch set or package.

During the assembly of the clutch, the lamellae sets or packages can be assembled without regard to the tolerances of the individual lamellae, and the entire thickness of the package can be measured. The required slide bolt length is obtained on the basis of the set thickness, the remaining clutch dimensions and the empirically determined optimum play or clearance between the individual lamellae.

The optimum play between the lamellae remains preserved for a long period of operation as a result of the correct clutch design and under favorable operating conditions. However, a correction, if necessary, can take place in a simple manner by the exchange of the slide bolts, for example, during main servicing operations.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. In a friction clutch comprising a plurality of interspersed friction disks disposed along an axis and first means including a pressure plate for compressing said plurality of friction disks along said axis, thereby engaging the clutch, the improvement comprising second means disposed at said pressure plate for determining an axial distance of said plurality of friction disks in the noncompressed state dependent on a predetermined axial thickness of said plurality of friction disks, wherein said second means includes a plurality of pins fitted into a plurality of corresponding axial bores through said pressure plate, said pins having a length exceeding the axial thickness of said pressure plate, and said pins being slidable in said bores, and wherein said plurality of interspersed friction disks include two sets of said interspersed friction disks, each of said two sets disposed at opposing sides of said pressure plate.

2. A friction clutch according to claim 1, wherein said first means operates said pressure plate in opposite directions along said axis for compressing a corresponding set of said friction disks.

3. A friction clutch according to claim 1, wherein said predetermined axial thickness of said plurality of friction disks is an optimum venting path for said plurality of friction disks in the noncompressed state.

4. A friction clutch according to claim 1, wherein the number of said friction disks in said plurality is variable and the axial thickness of respective friction disks is variable.

5. A friction clutch according to claim 1, wherein said plurality of pins are exchangeable for another plurality of said pins having a different length.

* * * * *